United States Patent Office 3,364,145
Patented Jan. 16, 1968

3,364,145
FRICTION MODIFIED FLUID COMPOSITIONS
Ferdinand P. Otto, Woodbury, N.J., assignor to Mobil Oil Corporation, a corporation of New York
No Drawing. Filed Apr. 28, 1965, Ser. No. 451,647
16 Claims. (Cl. 252—76)

ABSTRACT OF THE DISCLOSURE

Transmission fluids consisting of a lubricating oil and an effective amount of a zinc formate-zinc (unsaturated-$C_{12}$–$C_{24}$) carboxylate complex product possess improved anti-squawk tendencies. The complex is produced by neutralizing a $C_{12}$–$C_{24}$ unsaturated carboxylic acid and formic acid with a zinc base, preferably by reacting one of the acids first with excess zinc base and then adding the second acid to the reaction mixture.

This invention relates to friction-modified fluid compositions, and in particular it relates to novel compounds for use in automatic transmission fluids and to methods of preparing such compounds.

In many industrial and automotive machinery, lubricants, power transmitting fluids or hydraulic fluids require some modification of their friction-reducing properties to permit the machinery in which they are used to operate efficiently. Inadequate lubrication may permit abrasion between moving metal surfaces, or no movement at all. Excessive lubrication may cause slippage between the moving parts and hence the desired frictional characteristics are lacking.

For example, an objectionable occurrence in the operation of automatic transmissions is "squawk." Squawk occurs during the changing of gears, particularly in the second-to-third shift as a result of a "stick-slip" phenomenon at the clutch surfaces. This short-lived high-pitched noise, found in certain automotive transmission systems, appears to be caused by improper or insufficient lubrication on the clutch plates and discs. A fluid which could both prevent squawking and yet permit the gears to be changed efficiently would be most desirable.

It is a major object of this invention to provide novel friction-modified fluid compositions. Another object is to provide novel automatic transmission fluids which prevent squawking. Yet another object of this invention is to provide novel reaction products of zinc neutralization of organic acids. A further object is to provide a method for preparing complex zinc salts of such acids.

The aforementioned and other objects I accomplish by adding to a fluid for use in automotive or industrial machinery a minor amount of a product obtained by reacting an unsaturated long-chain monocarboxylic fatty acid, formic acid, and an inorganic zinc compound, wherein the molar ratio of the unsaturated acid to formic acid is in the range of 0.75–1.5 to 1. The unsaturated long-chain acid contains about 12 to about 24 carbon atoms and a single double bond, preferably oleic acid. The ratio of the aforementioned unsaturated acid to formic acid is preferably 1 to 1. Although automatic transmission fluids alone permit squawking to occur, even a very small amount of the reaction product of this invention when added to the fluid substantially alleviates this condition.

While the exact chemical structure of the reaction product is not fully understood, it is believed that the product is a complex of the neutral zinc salts of the two organic acids, in the same molar proportions as the two acids. If the organic acids are present in equimolar amounts, the ratio of a complex salt derived therefrom will also be 1 to 1.

The range of ratios of acid reactants and the resulting salts in the product is important in preparing the products of this invention. The 0.75–1.5 to 1 mole ratio zinc salt complexes, and preferably the equimolar zinc salt complex, of the unsaturated long-chain acid and formic acid are soluble in oil to an effective extent of up to 10% by weight. However, by increasing the ratio of the unsaturated acid to formic acid, for example, to 3 to 1, the resulting product is rendered insoluble in oil and thus is of no use in the present formulation. Decreasing the ratio to 1 to 2 of unsaturated acid to formic acid also results in an oil insoluble product.

In the practice of this invention the procedure for the double neutralization reaction consists of adding one of the acids to the reaction vessel first, followed by the zinc compound. Preferably, but not essentially, the zinc salt should be formed before adding the second acid; the selection of the acid in this first step is not critical. The zinc is usually added in excess of the stoichiometric requirement for preparing the first single salt. Alternatively just enough zinc compound is added to completely neutralize the first acid and thereafter additional zinc is added after the first salt has been formed. Thus the desired amount of unreacted zinc compound is present when the second acid is added. The total zinc compound added is at least in stoichiometric proportion to the two acids together, and preferably about 1% to 30% of a stoichiometric excess over the total required to neutralize both acids. The zinc compound is an inorganic reactant, including zinc carbonate, zinc oxide, and zinc hydroxide.

In the first step, the temperature is in the range of from room temperature, or at least about 20° C., to about 60° C. If zinc carbonate is used, the temperature is near the lower end of the range to prevent undue foam formation by the too sudden release of carbon dioxide.

To this reaction mixture containing the zinc carboxylate and unreacted zinc compound is added the second acid. The remaining amount of zinc compound reacts with it at a temperature ranging from about 60° to about 80° C. The second acid is preferably added gradually and the temperature increase should also occur gradually. When the second acid is completely mixed into the reaction mass, the temperature is again raised to a maximum temperature of about 175° C. Since water of neutralization is continually being formed during the additional steps, it is withdrawn during this latter heating stage. If desired, an azeotroping agent may be added, and the temperature may be thus kept at a lower level while removing the water. Finally excess zinc compound is removed by filtration through a filter-aid medium, such as diatomaceous earth.

The reaction is ordinarily performed in a liquid state, if desired, in the presence of an inert liquid. The preferred liquid medium is a process oil. In the examples, I have used a paraffinic mineral oil having a viscosity of 100 SUS at 100° F. This oil solution may be retained as a carrier for the reaction product. The oil-solution form is convenient when adding the reaction products of this invention to a transmission fluid. Although the products of this invention are soluble in typical automatic transmission fluids, the use of a fluid-miscible oil carrier obviates the necessity of additional mixing steps.

Commercial transmission fluids usually consist of lubricating oils, such as mineral oils, carboxylic ester lubricants, hydrocarbons, phosphorus acid esters, and the like; these liquids may also be blended with antifoaming agents, viscosity control agents, detergents, antioxidants and other common additives.

Oleic acid is preferred of the unsaturated long-chain acids, because of its wide availability. Other acids, having from about 12 to about 24 carbon atoms, including the tall oil fatty acids, may be used. However, the salts of saturated long-chain acids do not eliminate transmission noises and are unacceptable for the purposes of this invention.

The third reactant, formic acid, as discussed heretofore, is an essential ingredient. The higher saturated fatty acids, commencing with acetic acid, are known to form thick greases when used as salt complexes with other acids.

The following examples, serve to illustrate the invention, without imputing any limitation thereto. Parts and percents unless otherwise defined, are deemed to be in terms of weight.

EXAMPLE I

Into a 1-liter, four-necked flask equipped with a mechanical stirrer, a reflux condenser with a water take-off receiver, thermometer, and dropping funnel, were added 100 grams (0.354 mole) of distilled oleic acid and 236 grams of a paraffinic mineral oil. The temperature was increased from room temperature to 60° C. gradually while 55.6 grams (0.443 mole) of zinc carbonate was added slowly to the oil solution. At the end of this addition, at 60° C., 18 grams (0.354 mole) of 90.5% formic acid was introduced dropwise over a 40-minute period, during which time the temperature rose to 73° C. Carbon dioxide gas evolved during this addition.

The resulting reaction product was then heated to 175° C. under a nitrogen blanket and held at this temperature for one hour. The reaction product in the flask was afterward filtered hot through a heated Buchner funnel containing a layer of diatomaceous earth. The clear liquid filtrate was cooled to room temperature.

Test of agent in transmission fluid

A commercial automatic transmission fluid was blended with a small quantity of the product prepared in Example I to form a 3% solution of the product. Both the 3% solution and the untreated fluid were tested in a squawk test outlined as follows:

A 1958 Oldsmobile, equipped with a dual-range automatic transmission is used as the test car. A four-inch hole is cut in the floorboard above the vent in the bell housing of the transmission and a thermocouple is inserted into the transmission pan, the potentiometer for the thermocouple being adapted to detect temperatures of from 50° to 300° F.

The transmission is completely disassembled, cleaned, repaired (including replacing clutch plates), and carefully reassembled and adjusted for optimum performance. The transmission is then filled with the untreated commercial fluid, and the car is road-driven until an audible noise or squawk is heard during shift. This fluid is withdrawn while hot and the fluid containing the test agent is added; again the car is road-driven. The driving procedure simply involves warming up the engine during which time the transmission fluid temperature rises to at least 100° F. The throttle valve linkage should be adjusted to permit the gear shifting to occur at the manufacturer's rated speeds (squawk usually occurs at the 2 to 3 shift in gears).

The results of this test are as follows (percents are by weight):

| Fluid | Max. Temp., ° F. | Test Result |
|---|---|---|
| (1) Commercial Automatic Transmission Fluid. | 225 | Consistent trace squawk. |
| (2) 97% fluid (1)+3% of product of Example I. | 230 | No squawk. |

EXAMPLE II

In a reaction flask equipped in a manner similar to that of Example I, 600 grams (2.12 moles) of distilled oleic acid and 1395 grams of the process oil were mixed together. The contents of the flask were heated under agitation, and at 50° C., 265 grams (2.11 moles) of zinc carbonate were stirred in. The temperature continued to rise, and commencing at 60° C., 108 grams (2.11 moles) of 90% by weight of formic acid were added. During this addition the temperature ranged from 60° to 75° C. Afterward, 200 cc. of benzene were added and the temperature raised to the azeotropic point in the range of 70° to 115° C.

When substantially all of the theoretical amount of water of neutralization was collected, the contents were heated at 150° to 156° C. for two hours and thereafter at 160° C. and about 100 mm. Hg the heating taking place while passing nitrogen gas into the reactor. The remaining contents were filtered as in Example I.

Test of agent in transmission fluid

As in the test of Example I, the liquid product prepared in Example II was tested in a typical transmission base oil. The concentration of the test sample was 1.1% by weight. The test car used in this test was a 1955 Oldsmobile.

Using the same squawk-test procedure as disclosed in Example I, the following results were obtained:

| Fluid | Max. Temp., ° F. | Test Results |
|---|---|---|
| (3) Transmission base oil | 200 | Consistent medium/heavy squawk. |
| (4) 98.9% fluid (3)+1.1% product of Example II. | 230 | No squawk. |

In the first two examples, oleic acid was reacted with the zinc compound initially. In the following example, the procedure is modified by neutralizing the formic acid first.

EXAMPLE III

Using the same equipment as in the previous examples, 24.4 grams (0.195 mole) of zinc carbonate and 100 cc. of distilled water were introduced into the reaction flask. Through a dropping funnel, at a rate designated to maintain room temperature were added 18 grams (0.354 mole) of 90.5% formic acid. The amount of zinc carbonate represents a 10% excess over the requirement for complete neutralization of the formic acid.

When all of the formic acid had been added, 22.2 grams (0.177 mole) of zinc carbonate were stirred into the reaction mass and the temperature was raised to 70° C. A solution of 100 grams (0.354 mole) of distilled oleic acid and 236 grams of the process oil preheated to 60° C. was added and the flask temperature increased to 175° C. The heat was maintained for three hours, while water was collected in the distillate receiver. At the end of this time, the reaction mass was filtered hot through a heated Buchner funnel containing a diatomaceous earth filter aid. The filtrate cooled to a clear liquid. Analysis of this product for zinc content was approximately the same as for those of Examples I and II.

The reaction products, or complex salts, of this invention have thus been shown to successfully eliminate clutch noises in automatic transmissions. Approximately 0.1% to about 10% by weight of product in commercial transmission fluids generally provides sufficient protection against squawk. Furthermore, the products of this invention are compatible with other transmission fluid agents such as viscosity index improvers, detergents, antioxidants, and the like.

Although this invention has been illustrated by specific examples containing procedures and conditions for obtaining the products of this invention, it is not intended that the invention be limited to such as shown in those examples except as claimed in the following claims:

I claim:
1. An automatic transmission fluid composition having anti-squawk properties consisting essentially of a major amount of a lubricating oil and a minor amount sufficient to provide anti-squawk properties of a product resulting from the neutralization reaction between formic acid, an unsaturated fatty acid having from about 12 to about 24 carbon atoms, and an inorganic basic zinc compound, in which reaction the two acids are present in molar amounts ranging from 0.75 to 1.5 moles of said unsaturated acid per mole of formic acid said zinc compound being present in an amount sufficient at least to completely neutralize the said acids.

2. The automatic transmission fluid composition of claim 1, wherein the unsaturated fatty acid is oleic acid and the zinc compound is inorganic basic zinc carbonate.

3. The automatic transmission fluid composition of claim 1, wherein the said unsaturated fatty acid and formic acid are present in equimolar amounts.

4. The automatic transmission fluid composition of claim 1, wherein the zinc compound is present in excess of from 1% to 30% over the stoichiometric requirement for completely neutralizing the said acids.

5. An automatic transmission fluid composition consisting essentially of a major amount of a lubricating oil and a minor amount of a reaction product prepared by steps of (1) reacting a stoichiometric excess of zinc carbonate and oleic acid in the presence of a paraffinic mineral oil, (2) thereafter reacting the remaining zinc carbonate with formic acid in the presence of the reaction mass of step (1), and (3) removing water formed in the reaction steps (1) and (2) the mole ratio of oleic acid to formic acid being in the range of 0.75 to 1.5 to 1, the total amount of the zinc carbonate being at least sufficient to react completely with the oleic acid and formic acid.

6. The method of preparing anti-squawk agents for automatic transmission fluids comprising reacting both an unsaturated fatty acid having from 12 to 24 carbon atoms and formic acid, the ratio of said acids being in the range of 0.75–1.5 moles of unsaturated acid to 1.0 mole of formic acid, with an inorganic basic zinc compound present in an amount sufficient at least to completely neutralize the said acids, and withdrawing water produced in reaction.

7. The method of claim 6 wherein the zinc compound is zinc carbonate.

8. The method of claim 6, wherein the zinc compound is present in excess of 1% to 30% over the stoichiometric requirement.

9. The method of claim 6 wherein the reaction takes place in the presence of an inert paraffinic mineral oil.

10. The method of claim 6, wherein the unsaturated acid is oleic acid.

11. The method of preparing anti-squawk agents for automatic transmission fluids comprising reacting equimolar amounts of an unsaturated fatty acid having from 12 to 24 carbon atoms and formic acid with an inorganic basic zinc compound present in an amount sufficient at least to completely neutralize the said acids.

12. The method of preparing anti-squawk agents for automatic transmission fluids comprising the steps of mixing oleic acid, and inert paraffinic mineral oil, and an excess of zinc carbonate at a temperature ranging from room temperature to 60° C., then raising the temperature from 60° C. to about 80° C., and adding formic acid gradually thereby maintaining the temperature below 80° C., and finally withdrawing the water formed in the said reaction.

13. As a novel composition of matter, a reaction product prepared from the reaction of 0.75 to 1.5 moles of an unsaturated fatty acid having from 12 to 24 carbon atoms and 1.0 mole of formic acid with an inorganic zinc compound present in an amount sufficient at least to completely neutralize the said acids.

14. The novel composition of matter of claim 13, wherein the unsaturated acid is oleic acid.

15. The novel composition of matter of claim 13, wherein the zinc compound is zinc carbonate.

16. As a novel composition of matter, a reaction product prepared from the reaction of equal moles of an unsaturated fatty acid having from 12 to 24 carbon atoms and formic acid with an inorganic basic zinc compound present in an amount sufficient at least to completely neutralize the said acids.

References Cited

UNITED STATES PATENTS 3,017,361  1/1962  Morris et al. _____ 252—75 XR

LEON D. ROSDOL, *Primary Examiner.*

S. D. SCHWARTZ, *Assistant Examiner.*